1/24/84 XR 4,427,417

United States Patent [19]

Porasik

[11] 4,427,417

[45] Jan. 24, 1984

[54] PROCESS FOR PREPARING DETERGENT COMPOSITIONS CONTAINING HYDRATED INORGANIC SALTS

[75] Inventor: Paul A. Porasik, Southfield, Mich.

[73] Assignee: The Korex Company, Wixom, Mich.

[21] Appl. No.: 341,130

[22] Filed: Jan. 20, 1982

[51] Int. Cl.[3] .................... B01J 2/10; B01J 2/16; C11D 11/00; C11D 17/06

[52] U.S. Cl. .................... 23/313 R; 23/313 AS; 23/313 FB; 252/99; 252/135; 252/174; 252/174.13; 264/117

[58] Field of Search .......... 23/293 A, 313 R, 313 AS, 23/313 FB; 252/99, 135, 174, 174.17, 174.13, 174.21; 264/117

[56] References Cited

U.S. PATENT DOCUMENTS

| | | | |
|---|---|---|---|
| 2,895,916 | 7/1959 | Milenkevich et al. | 252/99 |
| 3,112,274 | 11/1963 | Morgenthaler et al. | 252/99 |
| 3,247,118 | 4/1966 | Matthaei | 252/99 |
| 3,597,361 | 8/1971 | Sumner | 23/313 AS |
| 3,625,902 | 12/1971 | Sumner | 23/313 AS |
| 3,933,670 | 1/1976 | Brill et al. | 23/313 R |
| 3,956,467 | 5/1976 | Bertorelli | 23/313 AS |
| 4,237,024 | 12/1980 | Fedechko | 252/99 |
| 4,253,849 | 3/1981 | Vrisakis et al. | 23/313 AS |

*Primary Examiner*—Bradley Garris
*Attorney, Agent, or Firm*—Haverstock, Garrett & Roberts

[57] ABSTRACT

Non-caking, granular detergent compositions suitable for use in automatic laundry machines or in automatic dishwashing machines are prepared from hydratable particulate detergent salts or such salts in admixture with other detergent ingredients such as non-hydratable detergent salts, surfactants, fillers, corrosion inhibitors, chlorine releasing agents, coloring agents and perfumes under conditions insuring substantially complete hydration of the hydratable detergent salts and agglomeration of the hydrated particulates in the composition into storage stable, dry, pourable agglomerates.

17 Claims, 1 Drawing Figure

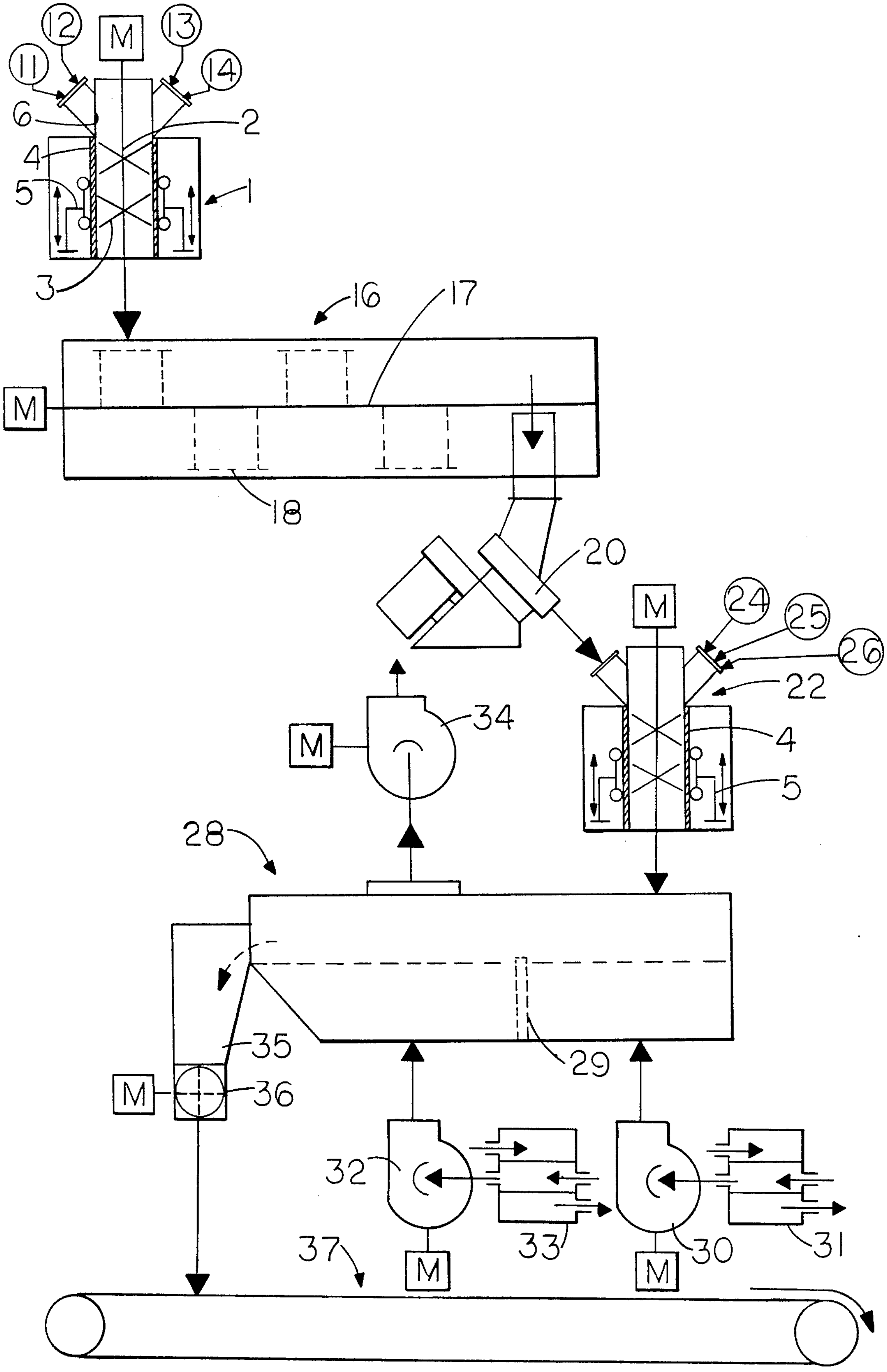
M
11
12
13
14
6
2
4
5
1
3
16
17
M
18
20
M
24
25
26
22
4
5
M
34
28
29
35
36
M
32
33
30
31
37
M
M

PROCESS FOR PREPARING DETERGENT COMPOSITIONS CONTAINING HYDRATED INORGANIC SALTS

FIELD OF THE INVENTION

This invention relates to a process for hydrating and agglomerating a particulate hydratable detergent salt or a mixture of such salts, and optionally in conjunction with one or more other detergent additives such as neutral alkali metal detergent salts, alkali metal hydroxides, surfactants, fillers or coloring agents. More particularly, the invention relates to a process for producing temperature stable, hydrated detergent salts in dry, pourable agglomerate form which are highly resistant to caking upon storage at ambient warehouse or household temperatures. The process of this invention further entails control of the hydrating conditions whereby the individual hydrating agglomerated detergent salt particulates are in continuous movement over each other to minimize formation of oversize clumps of agglomerated particles. Of particular economic importance is the adaptability of the process to a continuous rapid operation whereby a substantially hydrated and dried agglomerated detergent product ready for packaging can be produced in less than 30 minutes after the detergent salt particles have been first contacted by an atomized water spray, as compared to previously known processes for hydrating detergent salts which require upwards of 4 to 24 hours to obtain substantially complete hydration and most often resulted in a caked product which had to be broken up and ground to obtain useful sized particles.

DESCRIPTION OF THE PRIOR ART

Many techniques have been described in the patent and scientific literature for formulating detergent compositions based on hydratable detergent salts which most usually include the "condensed phosphates" generally characterized by the structural formula:

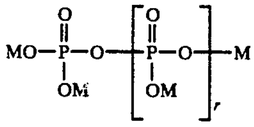

wherein M is hydrogen or an alkali metal, at least one M being an alkali metal and r is an integer ranging from 1 to about 6, the alkali metal carbonates, sulfates, pyrophospates and meta-borates, the water-soluble lower fatty acid salts of these alkali metals and the water-soluble sodium or potassium silicates. Most frequently the commerical detergent formulations contain at least one "condensed phosphate" in admixture with an alkali metal carbonate, sulfate or meta-borate.

The simplest detergent formulation technique is merely a mechanical mixing of the dry anhydrous detergent salts in powdered or crystalline form. Such mixtures, however, should be packaged in containers having a water vapor barrier to prevent access of water to the package contents or otherwise the contained salts begin hydrating and coalesce together forming a caked mixture. Once the package is opened, the vapor barrier is no longer effective to prevent caking of the contents. Furthermore, due to the dusty consistency of these formulations they are likely to cause nasal and respiratory irritation to users thereof. Because of these shortcomings, the dry mixing technique is presently not favored by detergent maufacturers.

Another method for preparing detergent formulation is to form a water slurry of the anhydrous detergent ingredients, which is dried in heated drums or by spray drying. Spray or drum drying yields acceptable detergent formulations. On the other hand, in today's economy capital costs for spray or drum drying equipment are almost prohibitive and the energy consumption, gas for heating the drying air or the rolls and electricity for pumps, fans and other equipment exceeds by a wide margin the energy consumption of other available processes for making detergent products.

Presently the current trend in the detergent industry is to use agglomeration techniques for producing dry pourable detergent compositions from anhydrous detergent salts. There are numerous agglomerating techniques described in the patent literature. For example, U.S. Pat. No. 2,895,916 to Milenkevich et al proposes forming in a batch type process agglomerates by wetting anhydrous detergent salts with aqueous sodium silicates and agitating the wetted salts in a ribbon mixer to form agglomerates and then aging the agglomerates with intermittent agitation until the salts have been substantially hydrated. The aging step, as described, may take from 0.25 to 4 hours to complete. The resultant aged agglomerates are caked and must be ground to yield granules capable of passing through a 10 mesh Taylor screen.

To eliminate the aging and sizing steps in the aforementioned patent, it is proposed in U.S. Pat. No. 3,625,902 to agglomerate particulate hydratable detergent ingredients by tumbling the ingredients in a rotating drum in such a manner that a falling curtain of the materials is maintained while spraying liquid material on the particulate material in the falling curtain to cause agglomeration thereof. A tumbling bed of agglomerated material is maintained at the base of the falling curtain of agglomerated material where it is subjected to shear forces adequate to reduce oversize particles. The process according to Examples 1 and 2 appears to be dependent on the use of starting feed materials having a particle size of about 200 U.S. mesh and involves a total processing time ranging between 34 to 46 minutes. Furthermore, the process as described appears to be limited to batch type operations.

U.S. Pat. No. 3,933,670 to Brill et al, does, however, describe a continuous process for producing detergent agglomerates. The patent describes the use of a rotating disc agglomerator upon which is fed a partially hydrated condensed phosphate salt, a hydratable detergent builder salt such as sodium carbonate, a chlorine releasing agent and water and/or an aqueous sodium silicate solution. The agglomerates formed on the rotating disc are transferred to a rotary dryer wherein the temperature conditions are such that free (unbound) water and water released from the hydrated builder salt upon its thermal dehydration conversion to a lower level of hydration are removed from the agglomerates. The agglomerates discharged from the dryer contain a high proportion of oversize material. As mentioned in Example 3, about 30% of the product was larger than 10 U.S. mesh size and this oversize material had to be ground in a hammermill. The grinding resulted in about 20 weight percent fines which had to be recycled back to the rotating disc. Apparently, the process is not susceptible to a control whereby the product discharged from the rotary dryer will all pass through a 10 U.S. mesh screen. Furthermore, it appears the dried agglomerates are of such hardness as to necessitate the use of a hammermill in order to obtain reduction in size.

In contradistinction to the aforementioned limitations of the prior art, the present invention has been found to provide a rapid and economical continuous process for converting hydratable particulate detergent materials into stable dry pourable agglomerates which do not require a grinding operation for size reduction to the particle size normally required in detergent formulations. Of particular importance is that the process effects substantially complete hydration of all of the hydratable detergent salts being processed whereby the final product does not cake during processing or during storage at ambient temperatures.

SUMMARY OF THE INVENTION

A pourable, storage stable, non-caking detergent composition in agglomerate form is prepared from one or more hydratable detergent salts by wetting particulates of such salts with an atomized stream of water or an aqueous solution of a detergent salt or both while the particulates are turbulently dispersed in an inert gaseous medium whereby the particulates are individually wetted with sufficient sprayed water for hydration, and agglomerate formation, then depositing the resultant wetted agglomerates in an otherwise closed container, retaining the wetted agglomerates in said container until they have been substantially hydrated while continuously gently stirring the wetted hydrating particles to prevent caking. The hydrated agglomerates are then dried, preferably in a fluid bed-dryer to eliminate most of the free water remaining after hydration. Alternatively, the hydrated agglomerates without being dried to remove free water can be physically combined with non-hydrating detergent salts in particulate form, by again turbulently dispersing the hydrated agglomerates in an inert gaseous medium together with particulate non-hydrating detergent salts and a liquid agglomerating agent such as an aqueous sodium silicate solution or an aqueous surfactant solution to yield slightly larger agglomerates than the original hydrated agglomerates, which are then dried in a fluid bed dryer to remove most of the free water. The hydrated agglomerates which in this manner have been combined with non-hydrating detergent salts and/or other detergent additives and then dried are also non-caking when packaged and stored for extended periods of time, and are free-flowing and readily soluble in cold or hot water.

DESCRIPTION OF THE INVENTION

This invention relates to a rapid, continuous process for producing dry, pourable non-caking detergent compositions in agglomerated form from one or more hydratable particulate detergent salts which are substantially hydrated and agglomerated during the process. The invention resides in the discovery that by uniformly and individually wetting each particle of hydratable salt in a salt feed-stream with a hydrating amount of water in the form of a fine spray while the particles are turbulently suspended in an inert gaseous medium such as atmospheric air, nitrogen or carbon dioxide, the wetted particles while still suspended in the gaseous medium coalesce together to form agglomerates of a size predominantly smaller than the openings of a No. 10 sieve of the U.S. Sieve Series and usually with more than about 90 percent small enough to pass through No. 12 sieve of the U.S. Sieve Series. Hydration of the hydratable salts in the agglomerates begins immediately while the agglomerates are still supsended in the gaseous medium and would proceed to substantially complete hydration within a period of about 5 to 30 minutes if it were practical to maintain the agglomerates in a freely suspended state under non-drying conditions. It has been found that substantially complete hydration of the hydratable salts can be readily accomplished by immediately depositing the wet agglomerates in a container having means for gently stirring the hydrated agglomerates. The container, except for an inlet opening to receive the wet agglomerates and an outlet opening to discharge substantially hydrated agglomerates, is otherwise closed to the atmosphere in order to retain therein sufficient water to accomplish substantially complete hydration. The gentle stirring means mentioned supra is of such design that it causes continuous gentle movement of the hydrating agglomerates in order to prevent caking together of the mass of agglomerates and on the other hand does not exert compacting forces on the agglomerates of a magnitude producing an undesired excess amount of oversize agglomerates. The substantially hydrated agglomerates are continuously discharged from the closed container and into a dryer apparatus wherein again the agglomerates are kept in motion while residual free (unbound) moisture is removed from the agglomerates by ambient or heated air contacting the agglomerates. The dried agglomerates discharged from the dryer usually contain less than 5 percent by weight of oversize particles retained on a No. 10 sieve of the U.S. Sieve Series. A unique feature of the present process is that any oversize agglomerate discharged from the closed container are of such soft consistency that they can be readily reduced in size by passing them to a rotating disc, roller or bar assembly which centrifugally propels them against and through a circular screen around the disc or bar periphery. Oversize agglomerates produced in the dryer apparatus are relatively frangible and thus are readily shattered to a desired particle size range. The oversize agglomerates in comparison to the agglomerates made by prior processes are not of such hardness as to necessitate the use of conventional grinding apparatus as for example, hammermills, ball mills and the like which yield a large amount of fines which have to be recycled to an agglomerater.

The invention further contemplates using the moist hydrated agglomerates discharged from the closed container as a base for adding thereto non-hydratable detergent salts, detergent fillers, coloring agents, chlorine releasing agents and/or surfactants to form new agglomerates of slightly increased size over the starting agglomerates. This aspect of the invention is practiced by introducing the moist hydrated agglomerates prepared as described supra into a second turbulently moving inert gas medium and concurrently adding particulates such as non-hydratable detergent salts, fillers, chlorine releasing agents and the like together with an aqueous agglomerating agent such as water, aqueous sodium silicate solutions or aqueous surfactant solutions. The resultant moist agglomerates are then dried to remove substantially all free (unbound) water, a fluid bed dryer being preferred for this step, although if desired other types of drying apparatus may be used as for example, rotating drum dryers. The resultant dried agglomerates are usually all in a particle size range between a-10 sieve of the U.S. Sieve Series and a number 100 sieve of the U.S. Sieve Series. The dried agglomerates are resistant to caking during storage and shipment to the ultimate consumer.

Reference is now made to the accompanying drawing showing a schematic diagram of one of the preferred processes of the present invention. The process illustrated is as follows: A commercially available apparatus generally indicated by 1 for turbulently suspending hydratable detergent salt particles in an inert gaseous medium while the particles are being individually wetted by a hydrating amount of water is the K-G/Schugi Blender-Agglomerator manufactured by Schugi bs, Amsterdam, The Netherlands, the U.S. distributor being The Bepex Corporation of Rosemont, Illinois, a subsidiary of The Berwind Corporation. The apparatus essentially comprises an electric motor (M) driving vertically mounted agitation shaft assembly 2, mounted within a cylindrical chamber and having a plurality of radially projecting knives 3. The degree of turbulence generated within upper metal cylinder 6 and cylindrical depending flexible rubber wall 4 is controlled by shaft speed (1000–3500 RPM) and by the relative position, angle and slope of the knives 3. The proper adjustment of the knives determines the residence time of the material within the cylinder 6 and rubber wall 4, such residence times in most instances being less than 1.0 second. One or more particulate hydratable salts are fed to upper cylinder 6 from metered sources 11 and 12. For example, metered source 11 can supply to the apparatus particulates of a condensed hydratable phosphate salt and metered source 12 can supply particulates of a hydratable alkali metal carbonate, borate, sulfate or a hydratable alkali metal salt of a lower fatty acid as for example sodium acetate. If desired, the several particulate salts can be premixed before being fed into the agglomerator-blender, but such premixing is not essential. A liquid surfactant from metered source 14, if desired can be sprayed on the salt particles. A metered source of hydrating water 13 sufficient to completely hydrate the hydratable salts, but not in excess of 20% over that required for theoretically complete hydration, is simultaneously introduced in the cylinder 6. The water is preferably air-atomized by passing through a spray nozzle (not shown) and is further shattered upon contacting the rotating knives 3 mounted on agitator-shaft 2 to effect uniform surface wetting of the solid particulates. An enrobing effect enables wetted particulates to build in size by clustering together and this agglomeration continues as the spheroidal shaped agglomerates travel downward within cylindrical wall 4 to the bottom discharge opening. Because of the short residence time that the agglomerates are retained in the agglomerator-blender 1, agglomerate size is usually limited to a maximum of about 2.5 mm.

Under some conditions, the wet agglomerates may have a tendency to stick to the interior cylinder walls. This condition can occur when liquid additives are sticky or are injected in large amounts. Such build-ups of agglomerates is overcome by continuously flexing cylindrical rubber wall 4 by means of a vertically oscillating roller assembly 5. The vertical movement of roller assembly 5 may be effected by pneumatic means, rotating cams or other equivalents.

The agglomerates discharged from agglomerator-blender 1 are continuously fed into a closed container 16 having a rotating agitator shaft 17 extending horizontally along the length of container 16. Attached to shaft 17 are radially projecting U-shaped bars 18 for gently stirring the contained agglomerates. Shaft 17 rotates at slow speeds of about 20 to 40 RPM in order not to cause compaction of the agglomerates into large lumps. Substantially complete hydration of the hydratable material in container 16 usually can be obtained in less than 10 minutes residence and in many instances in less than 5 minutes. Container 16 is preferably insulated or jacketed for hot water circulation to insure that sufficient heat is available to maintain the agglomerates at a high enough temperature to form stable hydrates and to effect thermal dehydration of whatever thermally unstable hydrates may have been formed. Except for its inlet and outlet openings, container 16 is otherwise closed to minimize water vapor loss to the atmosphere, the objective being insurance of an adequate quantity of water being maintained in the container to substantially fully hydrate the hydratable salt or salts. Optionally when indicated, additional water in the form of a fine spray or as steam may be introduced into the interior of container 16 to maintain an adequate quantity of water therein for substantially complete hydration of the hydratable salt or salts contained therein.

Hydrated agglomerates are continuously discharged from container 16 into a disintegrator 20 capable of breaking up occasional oversize lumps of aggregates before discharge is made to a second agglomerator-blender 22. The agglomerates as discharged from container 16 are relatively soft and dry to the touch but yet may contain a few percent by weight of free (unbound) water, sufficient, however, to cause the agglomerates to cake together when compressed by hand into a golf ball size mass. When such compressed mass of agglomerates is dropped on a hard surface, it disintegrates into small fragments. Disintegrator 20 similarly shatters into small fragments oversize agglomerates, usually less than 5% by weight of the total mass discharged from container 16, by means of rotating bars centrifically hurling the soft agglomerates against a circular screen for passage through the screen openings, typically about equivalent to a No. 4 U.S. Sieve Series.

The hydrated agglomerates discharged from disintegrator 20, if desired, can be directly fed into a dryer such as fluid bed dryer 28 wherein the free (unbound) moisture content of the agglomerates can be reduced to a relatively low level, e.g. 5% or less. Quite often it is desired to include in the agglomerates discharged from disintegrator 20 additional detergent agents such as non-hydratable detergent salts, surfactants, liquid alkali metal silicates, coloring agents or fillers. This is readily accomplished by continuously feeding metered amounts of hydrated agglomerates from lump disintegrator 20 directly into a second blender-agglomerator 22 while concurrently meter feeding therewith as desired particulate salts such as sodium sulfate or sodium chloride from source 24, an agglomerating agent such as liquid surfactants from source 25 and/or an aqueous alkali metal silicate solution from source 26. The amount of liquid agglomerating agent fed into agglomerator-blender 22 is determined by trial runs to ascertain the quantity required for specific formulations, being just enough to bring about agglomeration of all solid particulate matter in the mix without having an excess amount present which would produce a sticky product.

The product discharged from blender-agglomerator 22 requires a moderate amount of drying to remove most of the residual free water contributed by the aqueous agglomerating agent fed into agglomerator-blender 22 and the residual free water in the agglomerated hydrated salt discharged from container 16. This is accomplished by feeding the agglomerates discharged from blender-agglomerator 22 into a fluid bed dryer 28 wherein the agglomerates accumulate to the level indicated by the dotted horizontal line. A weir 29 of adjustable height is positioned about midway along the length of the dryer 28 to form two compartments therein for temporary retention of the agglomerates. Ambient or heated air is blown into the first compartment by blower 30 which receives heated air from heat exchanger 31. Flue gasses, steam or hot water can be used as the heating medium in heat-exchanger 31. The ambient or heated air is introduced into the bed of agglomerates residing in the first chamber, the air flow having enough velocity to maintain the bed of material in constant motion. Partially dried agglomerates are continuously moved over the top of weir 29 into the second compartment where they are further dried until the content of residual free (unbound) water is less than about 5% by weight by ambient or heated air passing through the bed of material in the second compartment. The ambient or heated air for the second compartment is supplied by blower 32 and heat exchanger 33. When heated air is employed, its temperature should be less than the temperature at which thermal dehydration of the hydrate can occur. Moisture laden air is exhausted from dryer 28 by an exhaust blower 34. The dried agglomerates are continuously discharged into funnel 35 from whence they drop into a disintegrator 36 wherein oversize agglomerates are shattered into smaller fragments. Disintegrator 36 is simply a rotating shaft with spaced radially projecting rods attached thereto for hurling oversize agglomerates against the interior walls of disintegrator 36. The shattering force developed in disintegrator 36 is sufficient to shatter the oversize agglomerates inasmuch as the agglomerates are not of such hardness as to require a hammermill to break them down into smaller particle sizes.

Agglomerates discharged from disintegrator 36 onto conveyor belt 37 are in condition for immediate packaging. The agglomerates are free-flowing, dry and pourable and do not cake together upon storage for extended periods of times in warehouses where ambient temperatures may go as high as 60° C.

The process as herein described is applicable to the formation of hydrated agglomerated detergents from a wide variety of detergent raw materials. The following examples are typical of the versatility of the process.

EXAMPLE 1

To compare the extent of hydration realized by the present process in comparison with a known conventional method of hydration, the following automatic dishwater formulation was agglomerated by both methods and permitted to hydrate. The hydratable salts in the formulation were anhydrous sodium tripolyphosphate, anhydrous sodium carbonate and sodium sulfate.

| Formulation Parts by Weight | |
|---|---|
| anhydrous sodium tripolyphosphate (granular) | 35.0 |
| anhydrous sodium carbonate (granular) | 25.0 |
| nonionic surfactant ("25-R-2", a condensate of propylene oxide with hydrophillic bases formed by condensing ethylene oxide and ethylene glycol and marketed by Wyandotte Chemical Co.) | 2.5 |
| potassium isocyanurate | 1.5 |
| anhydrous sodium sulfate (granular) | 12.5 |
| aqueous sodium silicate (47% solids) | 23.5 |

Conventional Method

All the above ingredients together with 12.5 parts by weight of tap water were dispersed and agglomerated in a Schugi blender-agglomerator (1) in the manner previously described. The wet agglomerates were deposited in a tote bin and permitted to age for 24 hours in order to obtain the maximum hydration possible of the sodium carbonate, the sodium sulfate and the sodium tripolyphosphate and was then analyzed for its content of free (unbound) water and hydrate bound water. Upon further aging extensive caking of the agglomerates in the tote bin was observed. X-ray diffraction patterns of these agglomerates showed partial hydration of the sodium tripolyphosphate but very little sodium carbonate monohydrate formation.

Invention Method

The 35 parts sodium tripolyphosphate and 25 parts sodium carbonate were metered into the Schugi blender-agglomerator (1) and wetted with a metered atomized feed of 12.5 parts tap water (residence time less than 3 seconds), forming small particle size wet agglomerates which were discharged into a closed container 16 which was thermally insulated in order to retain exothermic heat resulting from the hydration. The wet agglomerates while being continuously stirred were retained in container 16 for 6 minutes residence to effect hydration of the hydratable salts and discharged at an agglomerate temperature of about 72° C. The hydrated but still wet agglomerates were then discharged into a second Schugi blender-agglomerator (22) concurrently with proportioned feeds of the nonionic surfactant, potassium isocyanurate, sodium sulfate and the aqueous sodium silicate to yield agglomerates of a larger average size than the agglomerates discharged from the first blender-agglomerator (22). The agglomerates discharged from the second blender-agglomerator 22 were fed into a fluid-bed dryer 28 supplied with heated air from blowers 30, 32 at 43° C.-46° C. to accelerate drying and remained in the dryer for 5 minutes residence and then discharged. The dried agglomerates were non-caking on storage. These agglomerates and the agglomerates made by the conventional method were analyzed for content of free water and water bound as hydrate.

The percent free water in the agglomerates was determined by drying a weighed sample for two hours in an oven maintained at 50° C. and having forced air circulation, then again weighing the sample and calculating from the loss of weight the percentage of free moisture which was evaporated from the sample. The water bound as hydrate in the agglomerates was determined by heating fresh samples of the agglomerates for 1 hour at 150° C. in an oven having forced air circulation. From the difference in weight between the weight prior to being heated and the sample weight after heating, the percent total water content in the agglomerates can be calculated therefrom. The percent hydrate bound water is calculated by subtracting percent free moisture from percent total moisture. In this connection it should be understood that in practically all instances the alkali metal salt hydrates lose all their hydrated water when heated to a temperature of 150° C. For example, the sodium carbonate monohydrate whose presence in the agglomerates made by the present invention was verified by X-ray diffraction patterns dehydrates at 100° C. Similarly the sodium tripolyphosphate hexahydrate dehydrates at about 108° C.

On a calculated basis, the detergent formulation of this example should contain 13.00 percent water as hydrate water if the sodium tripolyphosphate was completely hydrated to sodium tripolyphosphate hexahydrate, the sodium carbonate was completely hydrated to sodium carbonate monohydrate and the sodium silicate was present as a stable hydrate of sodium silicate. The calculations are as follows:

| Formula | Wt. % | | Theoretical % Bound Water |
|---|---|---|---|
| sodium tripolyphosphate (STP) | 35.0 | 35 × .93% assay × .224 as $STP.6H_2O$ = | 7.29 |
| sodium carbonate | 25.0 | 25 × .998% assay × .145 as $Na_2CO_3H_2O$ = | 3.62 |
| nonionic surfactant | 2.5 | | |
| potassium isocyanurate | 1.5 | | |
| sodium sulfate | 12.5 | | |
| aqueous sodium silicate (47% solids) | 23.5 | 23.5 × .47% solids × .19 as hydrate = | 2.09 |
| | | Theoretical Total Bound Water | 13.00 |

The water content data of the agglomerates made by the conventional method were as follows:

| | | |
|---|---|---|
| Total water content as determined by heating to 150° C. | = | 10.9% |
| Free water content as determined by heating at 50° C. | = | 5.8% |
| Bound water (total water less free water) | = | 5.1% |

The 5.1 percent bound water corresponds to only 39.2% of the total amount of water that would have been held if all the sodium tripolyphosphate had been hydrated to sodium tripolyphosphate hexahydrate and all of the sodium carbonate had been hydrated to sodium carbonate monohydrate.

In contrast to the above very limited hydration effected by the conventional method, the product obtained by the present method contained 91.5 percent of theoretical hydrate water for sodium tripolyphosphate hexahydrate and for sodium carbonate monohydrate as evidenced by the following water content data.

| | | |
|---|---|---|
| Total water content as determined by heating to 150° C. | = | 15.1% |
| Free water content as determined by heating to 50° C. | = | 3.2% |
| Bound water content (total water less free water) | = | 11.9% |

The 11.9 percent bound water in these agglomerates corresponds to 91.5 percent of the amount of water required to fully hydrate all of the sodium tripolyphosphate to sodium tripolyphosphate hexahydrate and all of the sodium carbonate to sodium carbonate monohydrate. X-ray diffraction patterns of the agglomerates made according to the method of this invention showed sharp peaks for the presence of soda ash monohydrate and sodium tripolyphosphate hexahydrate.

EXAMPLE 2

A non-caking dry pourable agglomerate laundry detergent was prepared in accordance with this invention from the following ingredients:

| | Parts by weight |
|---|---|
| Granular sodium tripolyphosphate (93% assay) | 62 |
| polyoxy ethoxylated alcohol surfactant ("Neodol 25-7", a product of Shell Chemical Co.) | 11 |
| 40% active beads of the sodium salt of dodecylbenzene sulfonic acid | 4 |
| perfume | 0.1 |
| ultramarine blue | 0.05 |
| optical brightener ("RA-16", a solid stilbene product of Ciba-Geigy Co.) | 0.65 |
| sodium carboxymethyl cellulose | 1.5 |
| aqueous sodium silicate (47% solids) | 20 |
| alkaline protease enzyme ("Alcalase", a product of Novo Laboratories, Inc.) | 0.7 |

The sodium tripolyphosphate and 13 parts by weight of tap water at 20° C. were metered and fed into the first Schugi blender-agglomerator. The Schugi agitator shaft speed was 1800 RPM and was equipped with three sets of rotating knives (3). The top, middle and bottom knife sets were all adjusted to a +5° angle. Residence time in the blender-agglomerator was less than 3 seconds. The agglomerates formed in the Schugi (1) were continuously discharged into hydrator container 16 having a jacket temperature of 71° C. and an agitator running at 20 RPM. The residence time of the agglomerates in container 16 was 13.75 minutes and the agglomerates were discharged therefrom at an average temperature of 60° C. By moisture test determinations of the agglomerates discharged from container 16 it was determined that 80% by weight of the sodium tripolyphosphate had been hydrated to the hexahydrate.

The agglomerates discharged from container 16 were fed at a rate of 1158 pounds per hour into the second Schugi blender-agglomerator (22) adjusted to the same knife angles and RPM as the first blender-agglomerator (1) concurrently with metered feeds of the sodium carboxymethyl cellulose, the 40% active beads of the sodium salt of dodecylbenzene sulfonic acid, the dye, the optical brightner, the "Alcalase", the "Neodol 25-7", the perfume and the aqueous sodium silicate.

Agglomerates formed in the second Schugi blender-agglomerator (22) exited at an average temperature of 59° C. and were directly fed into fluid bed dryer 28, and retained therein for an average residence time of 3 minutes. Air heated to 60° C. was supplied to dryer 28 by blowers 30 and 32. The agglomerates emerging from dryer 28 had a crisp texture, an average free moisture content of 3.3%, and a particle size range between a No. 10 Sieve and a No. 100 sieve of the U.S. Sieve Series, with less than 2 percent larger than the openings in a No. 10 U.S. Sieve Series and less than 2 percent smaller than the openings in a No. 100 U.S. Sieve Series. From water-content analysis it was determined that on average 82% of the sodium tripolyphosphate had been hydrated to sodium tripolyphosphate hexahydrate. The product had a bulk density of 48 pounds per cubic foot. When packaged and stored at ambient temperatures for six months there was no caking of the product, and it would dry pour as a free flowing product rapidly out of the package.

EXAMPLE 3

A laundry detergent formulation based on sodium carbonate as the major detergent "builder" salt was prepared from the following ingredients:

| | Parts by weight | |
|---|---|---|
| granular sodium carbonate (98.5% assay) | 65 | |
| water | 10 | |
| surfactant (Neodol 25-7, a $C_{12}$-$C_{15}$ linear aliphatic alcohol product of Shell Chemical Co.) | 11 | |
| 40% active bead of the sodium salt of dodecylbenzene sulfonic acid* | 3.95 | |
| perfume | 0.1 | |
| ultramarine blue | 0.05 | |
| optical brightener ("RA-16", a solid stilbene product of Ciba-Geigy Co.) | 0.7 | (as solids) |
| sodium carboxymethyl cellulose** | 1.5 | |
| aqueous sodium silicate (47% solids) | 7.0 | |
| alkaline protease enzyme ("Alcalase" a product of Novo Laboratories, Inc.) | 0.7 | |

*nonionic surface active agent
**soil antideposition agent

The sodium carbonate and water at 20° C. were metered and fed into the first Schugi blender-agglomerator at a residence time less than 3 seconds. Blender-agglomerator (1) was adjusted to operate at the same speed and knife settings as described in Example 2. The wet agglomerates formed therein were continuously discharged into hydrator container 16 having a jacket temperature of 71° C. and with its agitator shaft running at 20 RPM. The average residence time of the agglomerates in container 16 was 17.8 minutes and the agglomerates were discharged therefrom at an average temperature of 60° C. By moisture test determinations on the discharged agglomerates it was found that 80.5 percent by weight of the sodium carbonate had been hydrated to sodium carbonate monohydrate. The agglomerates discharged from container 16 were fed to a second Schugi blender-agglomerator (22) whose shaft RPM and knife angle settings were the same as the first Schugi blender-agglomerator (1). The feed rate of agglomerated hydrated sodium carbonate to the second blender-agglomerator (22) was proportioned to the formula weights of the concurrently fed sodium carboxymethyl cellulose, the 40% active beads of the sodium salt of dodecylbenzene sulfonic acid, the pigment, the optical brightner, the "Alcalase", "Neodol 25-7", the perfume and the aqueous sodium silicate.

The agglomerates formed in this second blender-agglomerator were discharged at a temperature of 63° C. into a fluid bed dryer (28) and were retained therein for an average of 4 minutes while being dried with air at a temperature of 60° C. blown into the bed of agglomerates by blowers 30, 32. The agglomerates discharged at a temperature of 42° C. from dryer 28 had a crisp texture, an average free moisture content of 2.75 percent, a bulk density of 46 pounds per cubic foot and a particle size range principally between a No. 10 sieve and a No. 100 sieve of the U.S. Sieve Series, with less than 2 percent being larger than the openings in a No. 10 sieve of the U.S. Sieve Series. The agglomerates after packaging and storage at ambient temperatures for 3 months did not cake and were freely pourable from the package. From moisture content determination of the dried agglomerates it was calculated that 81 percent of the sodium carbonate had been hydrated and from its X-ray diffraction patterns it was evident that the hydrated product was essentially sodium carbonate monohydrate.

As previously mentioned, hydration of the hydratable detergent salts is initiated immediately upon the turbulently moving salt particulates being impinged with the air-atomized water stream in the first Schugi blender-agglomerator (1). The percent hydration attained during the extremely brief residence time (1-3 seconds) of the salt particulates in this blender-agglomerator was rather surprising, being as much as 61 percent of theoretically possible hydration. This and other novel features attendant from the practice of the invention is illustrated in the following examples.

EXAMPLE 4

An automatic dishwasher detergent formulation in the form of dry pourable agglomerates was prepared from the following ingredients:

| | Parts by weight | |
|---|---|---|
| granular anhydrous sodium tripolyphosphate (93% assay) | 27.9 | |
| granular anhydrous sodium carbonate (98.5% assay) | 14.0 | |
| granular sodium chloride | 35.3 | |
| chlorinated isocyanurate ("ACL-59", a product of Monsanto Company.) | 0.9 | |
| aqueous sodium silicate (47% solids) (1:2.4 ratio $Na_2O/SiO_2$) | 10.0 | (as solids) |
| Non-ionic surfactant ("25-R-2", a condensate of propylene oxide with hydrophilic bases formed by condensing ethylene oxide and ethylene glycol marketed by Wyandotte Chemical Company.) | 1.9 | |
| Water | 10.0 | |

The first Schugi blender-agglomerator (1) was continuously meter fed sodium tripolyphosphate, the sodium carbonate and the water at 20° C. which were retained therein for a maximum time of three seconds. The wet agglomerates discharged therefrom had a bulk density of 39 lbs./ft$^3$. Periodic sampling of the wet discharged agglomerates and testing for free and bound moisture contents indicated an average hydrations of 70.1% of that theoretically possible for the sodium tripolyphosphate and for the sodium carbonate. The Schugi blender-agglomerator (1) used in this commercial size run had three sets of knives (3) with all being adjustable to a +5° angle. The agitator shaft assembly (2) was rotated at 1800 RPM. The wet agglomerates were continuously charged into hydrator container 16 having a jacket temperature of 71° C. and remained therein for an average residence time of 16.4 minutes while subjected to continuous mild agitation by agitator shaft 17 rotating at 20 RPM in order to effect further hydration and to prevent oversize lump formation. Agglomerates were discharged from the hydration container 16 at an average temperature of 62° C. and were periodically sampled for moisture content analysis which indicated that the two salts in the agglomerates had been further hydrated to an average of 73.7% of theoretically possible hydration. Average bulk density of the agglomerates discharged from container 16 was 59.8 lbs./ft$^3$.

The agglomerates discharged from container 16 were continuously meter fed to the second Schugi blender-agglomerator (22) and turbulently mixed therein for an average residence time of less than 3 seconds with concurrent metered feeds of the sodium chloride, ACL-59, the sodium silicate at 63° C. and the nonionic surfactant. This blender-agglomerator (22) was operated at an agitator shaft speed of 2025 RPM and with its three sets of knives (3) adjusted in such manner that the top set was held at a +10° angle, the middle set of knives having half of its knives set at a +10° angle and the other half at a +85° angle and the bottom set of knives set at a +2° angle. The agglomerates discharged from this Schugi blender-agglomerator at an average temperature of 37° C. were continuously fed into a fluid bed dryer 28 and retained therein for an average residence time of 4.5 minutes before being discharged at an agglomerate temperature of 37° C. to a conveyor belt 37. Periodic sampling of the dried agglomerates for moisture content showed an average free moisture content of 2.6% and a calculated hydration of 74.7% of theoretically possible hydration.

The dried agglomerates had an average bulk density of 46.06 lbs./ft³. A sieve analysis of the agglomerates showed the following particle size distribution (cumulative weight %):

| | | |
|---|---|---|
| +8 | retained on a No. 8 U.S. Sieve Series | 2.26 |
| +12 | retained on a No. 12 U.S. Sieve Series | 9.74 |
| +20 | retained on a No. 20 U.S. Sieve Series | 58.06 |
| +40 | retained on a No. 40 U.S. Sieve Series | 95.16 |
| +50 | retained on a No. 50 U.S. Sieve Series | 98.7 |
| +100 | retained on a No. 100 U.S. Sieve Series | 99.52 |

The agglomerates upon being packaged and then stored for 3 months at ambient warehouse temperatures were found to have retained their dry pourability and showed no evidence of caking.

EXAMPLE 5

An automatic dishwasher formulation similar to that described in Example 4, but containing, however, higher amounts of sodium carbonate and sodium tripolyphosphate and only a relatively small amount of sodium chloride as a filler was prepared from the following ingredients:

| | Parts by weight | |
|---|---|---|
| granular anhydrous sodium carbonate (98.5% assay) | 32.7 | |
| granular anhydrous sodium tripolyphosphate (93% assay) | 33.5 | |
| granular sodium chloride | 4.4 | |
| "ACL-59" (potassium dichloroisocyanurate marketed by Monsanto Company) | 1.3 | |
| aqueous sodium silicate (47% solids) (1:2.4 ratio $Na_2O/Si\ O_2$) | 13.0 | (as solids) |
| nonionic surfactant (Wyandotte 25-R-2) | 1.9 | |
| water | 13.2 | |

The first Schugi blender-agglomerator (1) was continuously meter fed the sodium tripolyphosphate, the sodium carbonate and the tap water at 20° C. all of which were retained therein for a maximum time less than 2 seconds. The wet agglomerates formed therein, as discharged, had a bulk density of 42.3 lbs./ft³. The rotational speed of the agitator and the ° angle setting of its knives were the same as specified in Example 4 for the first blender-agglomerator (1). The wet agglomerates hydrated to 71.2% of theoretically possible hydration and at a temperature of 59° C. were continuously charged into hydrator-container 16 having a jacket temperature of 70° C. and remained therein for an average residence time of 9.9 minutes while subjected to continuous mild agitation by agitator shaft 17 rotating at 20 RPM in order to effect further hydration and to prevent oversize lump formation. Agglomerates were discharged from hydrator-container 16 at an average temperature of 65° C. and were periodically sampled for water content analyses which indicated that the two salts in the agglomerates had been further hydrated to an average of 71.4% of theoretically possible hydration. Average bulk density of the agglomerates discharged from hydrator-container 16 was 55 lbs./ft³.

These agglomerates were then continuously meter fed to the second Schugi blender-agglomerator (22) and turbulently mixed therein with concurrent metered feeds of sodium chloride, ACL-59, aqueous sodium silicate at 43° C. and the Wyandotte 25-R-2 nonionic surfactant at 32° C. This blender-agglomerator (22) was operated at an agitator shaft speed of 2000 RPM and with its top set of knives adjusted to a +10° angle, half of its middle set of knives adjusted to a +10° angle and the other knives to a +85° angle and with all the bottom knives adjusted to a −2° angle. Average residence time for the agglomerates formed in this blender-agglomerator was less than 3 seconds. Average bulk density of the discharged agglomerates was 41.3 lbs./ft³ and their average temperature was 52° C. The discharged agglomerates were continuously fed into fluid bed dryer 28 and retained therein for an average residence time of 6.3 minutes before discharge at an average temperature of 53° C. Air heated to 70° C. was supplied to fluid bed dryer 28 via blowers 30, 32 to accelerate the drying of the agglomerates. Periodic sampling of the agglomerates discharged from the fluid bed dryer showed an average free moisture content of 2.9% and a calculated hydration of 78.9% of theoretically possible hydration.

The dried agglomerates had an average bulk density of 45.5 lbs./ft³. A sieve analysis showed the following particle size distribution (cumulative weight %):

| | | |
|---|---|---|
| +8 | retained on a No. 8 U.S. Sieve Series | 3.98 |
| +12 | retained on a No. 12 U.S. Sieve Series | 10.58 |
| +20 | retained on a No. 20 U.S. Sieve Series | 62.78 |
| +40 | retained on a No. 40 U.S. Sieve Series | 96.12 |
| +50 | retained on a No. 50 U.S. Sieve Series | 99.04 |
| +100 | retained on a No. 100 U.S. Sieve Series | 99.76 |

These agglomerates were free-flowing, dry and pourable without dusting, and when packaged and stored for 3 months at ambient warehouse temperatures, were found to have retained their dry pourability and showed no evidence of caking.

The preceding examples are submitted as exemplary of the practice of the invention since it will be at once obvious to the persons skilled in the art to readily substitute other known equivalents for the specific ingredients used in these examples. By way of example, other known hydratable detergent salts which can be substituted for the sodium carbonate and sodium tripolyphosphate are the water soluble potassium salts such as potassium carbonate, potassium acetate, potassium borate, and potassium orthophosphate and the water soluble sodium salts such as sodium acetate, sodium sulfate, sodium meta or tetra borate and sodium formate. The choice of a particular hydratable detergent salt is one balanced by economics versus desired detergent performance and commerical availability. As respects the chlorine releasing agent (sanitizer) used in Example 1 many others are known to the trade. Many are derivatives of isocyanuric acids among which are potassium dichloroisocyanurate, sodium dichloroisocyanurate and trichloroisocyanuric acid. Other known chlorine releasing agents include chlorinated trisodium phosphate, trichloromelamine, imides such as N-chlorophthalimide, N-chloromalonimide, imides such as 1, 3-dichlorophthalimide and water soluble salts such as lithium hypochlorite and calcium hypochlorite.

The hydrated agglomerated detergent compositions prepared in accordance with this invention may if desired include in their formulations fillers such as sucrose, sucrose esters, alkali metal hydroxides, sodium chloride, potassium chloride and others known to the art. The surfactants which can be used include known nonionic surfactants, anionic surfactants and cationic surfactants, each group having specific known detergent properties and thus the choice of a specific surfactant depends on the properties desired in the final formulation.

Other ingredients frequently used in detergent compositions include the zeolites having water softening properties, alkali metal salts of citric acid such as sodium citrate and nitrilotriacetic acid (NTA) can aslo be used in the process of this invention.

The aqueous potassium silicates or sodium silicates having $K_2O$ or $Na_2O$ to $SiO_2$ ratio of about 1:3.75 to 1:2.0 are advantageously employed in preparing agglomerated detergent compositions being particularly useful for adhering other detergent additives to the surfaces of preformed agglomerates of hydrated salts as illustrated in Examples 2 and 3 hereof, in addition to their effectiveness as an alkaline "builder salt". The aqueous potassium or sodium silicates can, if desired, supply part or all of the water of hydration required for substantially hydrating the hydratable detergent salts in the initial hydration and agglomeration stage of this invention. Anhydrous particulate sodium or potassium silicates can also be used at this stage as well as the subsequent stage where additional detergent ingredients are admixed with the hydrated detergent salt agglomerates, providing there is enough free moisture present in the hydrated salt agglomerates or from other added ingredients to hydrate and bind the anhydrous sodium or potassium silicate particles to the surfaces of the hydrated salt agglomerates. The water required for this purpose may conveniently be supplied from the copresence of an aqueous surfactant solution. As an alternative, after hydration of the hydratable salt or salts have been essentially completed in the container—hydrator 16, dry silicate particulates such as anhydrous sodium metasilicate or sodium metasilicate pentahydrate may be added in the absence of added water to the hydrated salt agglomerates fed into the second Schugi agglomerator 22 to form a non-caking mixture of the hydrated salt agglomerates and the silicate particulates in which the silicate particulates do not agglomerate with the hydrated detergent salt agglomerates.

The preferred hydratable detergent salts for use in this invention based on cost/benefit consideration are sodium carbonate and sodium tripolyphosphate. It is well known that the latter exists in two forms. Form I is made by a relatively high temperature calcination process and is characterized by relatively rapid hydration rate. Form II is produced at lower calcination temperatures and is slower to hydrate. Either Form I or Form II sodium tripolyphosphate can be used in the practice of this invention. Most of the commercially available sodium tripolyphosphates are mixtures of Form I and Form II.

The only significant limitation on the choice of ingredients entering into the detergent compositions to be prepared in accordance with the methods of this invention are with respect to the thermal stability of the hydrated salts. It is essential in order to prevent caking of the packaged agglomerates caused by the presence of free water, that the phosphates and/or sodium carbonate be at least 70% hydrated prior to packaging. This degree of hydration will retard rapid migration of free water to a bound form and prevent caking when storage temperatures are as high as 65° C. or below freezing. For example, sodium tripolyphosphate hexahydrate thermally decomposes at 105° C. On the other hand sodium carbonate has three known hydrates of which the lower hydrate sodium carbonate monohydrate does not thermally dehydrate before reaching a temperature of about 100° C. Another hydrate is sodium carbonate heptahydrate and it dehydrates at about 32° C. The third hydrate is sodium carbonate decahydrate which has a dehydration temperature of about 33.5° C. To eliminate such unstable hydrates in the practice of this invention, the hydration step carried out in closed container 16 is done at a hydrating temperature above the thermal dehydration temperatures of the higher hydrates preferably between 55° C. and 85° C. but less than 100° C. Such elevated temperatures during the hydration step may entirely suppress the formation of the higher sodium carbonate hydrates or, if formed, thermally dehydrate them to the sodium carbonate monohydrate level. Similarly for this reason the temperature of the agglomerates being dried in the fluid bed dryer 28 should be kept below 100° C. and preferably between 30° C. and 60° C. to prevent overdrying to a stage producing insoluble matter such as by degradation of sodium silicate to $SiO_2$.

The residence time for the hydratable salts in the hydratator container 16 is a variable depending on the particular salt to be hydrated, the salt temperature, the efficiency of its agitator means and the degree of hydration desired. In some instances it can be less than 5 minutes and in other instances where it is desired to obtain practically 100 percent of theoretical hydration, the residence time can be extended to 30 minutes or more.

The term "substantial hydration" as used herein and in the claims is intended to encompass a degree of hydration between 70% and 100% of theoretical. Hydration salts having less than 70% of theoretical hydration yield agglomerates which tend to cake together during storage at ambient household or warehouse temperatures. In order to obtain a minimum of 70% theoretical hydration in the practice of this invention, it has been found that the water sprayed on the hydratable salts in the first blender-agglomerator (1) should be at least a stoichiometric amount but not in excess of about 20% over the stoichiometric amount as otherwise there is a tendency for a slurry of paste like formation to occur which requires longer drying times to remove the excess free water. Similarly, when the formulation contains more than about 30 percent by weight of liquid surfactant or of aqueous sodium silicate (40–50% solids), there is a likelihood for the agglomerates in either the first blender-agglomerator or the second blender-agglomerator 22 to compact together in a pasty mass that is difficult to process. It is preferred not to add a chlorine releasing agent during the formation and hydration of the agglomerates formed in the first blender-agglomerator (1) because available chlorine will be considerably reduced by contact with the water spray. However, when the chlorine-releasing agent is meter fed into the second blender-agglomerator (22) it has been found that an excess upwards of 90% of the available chlorine is retained in the agglomerates upon discharge from the fluid bed dryer 28.

The process herein described is not critical with respect to the particle size of the anhydrous salts fed into the first blender-agglomerator. Either granular or powdered particulates may be used, there being a slight advantage in the employment of powdered particulates as they appear to hydrate at a somewhat faster rate than the granular particulates, probably due to their greater surface area enabling the available water to wet a greater surface area.

Thus there has been shown and described a novel process for preparing detergent compositions containing hydrated inorganic salts which fulfills all of the objects and advantages sought therefor. It will be apparent to those skilled in the art, however, that many changes, variations, modifications and other uses and applications for the subject process are possible, and also such changes, variations, modifications, and other uses and applications which do not depart from the spirit and scope of the invention are deemed to be covered by the invention which is limited only by the claims which follow.

Having thus described my invention, what I claim is:

1. A continuous process for agglomerating and hydrating an anhydrous hydratable detergent salt which comprises continuously feeding and agglomerating particles of a hydratable detergent salt by turbulently dispersing said salt particles into an inert gaseous medium while wetting the dispersed particles with an atomized stream of water metered to provide at least a stoichiometric amount of water but not in excess of about 20% over said stoichiometric amount for hydration of the turbulently dispersed salt particles, depositing the resultant wet agglomerated salt particles into a closed container, retaining the agglomerated particles in said container until they have been substantially hydrated to a degree of hydration between 70% and 100% of theoretical while continuously gently stirring the agglomerates to prevent formation of oversize agglomerates, discharging the substantially hydrated agglomerates from said container and then drying the hydrated agglomerates to a free moisture content less than 5 percent by weight.

2. A continuous process for hydrating and agglomerating an anhydrous hydratable detergent salt according to claim 1 wherein the hydratable salt can form more than one hydrate with water including a hydrate which is thermally unstable at temperatures below 100° C. which comprises maintaining the temperature of the agglomerates of said salt while being stirred in the closed container at a temperature above the thermal dehydration temperature of the unstable hydrate but less than 100° C.

3. A process according to claim 2 wherein the anhydrous salt is sodium carbonate and its hydrated agglomerates are maintained at a temperature of at least 35° C. and less than 100° C. to form sodium carbonate monohydrate.

4. A process according to claim 1 wherein the hydratable detergent salt is a condensed alkali metal phosphate salt.

5. A process according to claim 4 wherein the condensed alkali metal phosphate salt is sodium tripolyphosphate and is hydrated to form sodium tripolyphosphate hexahydrate.

6. A process according to claim 1 wherein a mixture of sodium carbonate and sodium tripolyphosphate are agglomerated and hydrated to respectively form sodium carbonate monohydrate and sodium tripolyphosphate hexahydrate.

7. A continuous process for preparing a substantially hydrated detergent composition which comprises turbulently dispersing a feed of at least one hydratable detergent salt in particulate form in an inert gaseous medium, wetting the dispersed particles with an atomized stream of water or an aqueous alkali metal silicate metered to provide an amount of water sufficient to substantially hydrate the detergent salt, said metered amount of water constituting at least a stoichiometric amount but not in excess of about 20% over said stoichiometric amount for hydration of said salt and to cause the particles to agglomerate together to form agglomerates smaller than the sieve openings in a No. 8 U.S. Sieve Series, depositing the wet agglomerates in a closed container maintained at a temperature between at least 50° C. and less than 100° C. and retaining the agglomerates in said container while continuously gently stirring them to prevent formation of oversize agglomerates until the salt has been substantially hydrated to a degree of hydration between 70% and 100% of theoretical, removing the substantially hydrated salt agglomerates from said container and introducing them into a second zone of turbulence for dispersal in an inert gaseous medium while concurrently mixing therewith at least one or more members selected from the group consisting of non-ionic surfactants, anionic surfactants, cationic surfactants, neutral alkali metal salts, alkali metal hydroxides, solid chlorine releasing agents, alkali metal silicates, and anti-soil redeposition agents with the proviso that at least one member of the group upon being mixed with the hydrated salt agglomerates shall be in liquid form to provide sufficient wetting of the hydrated salt agglomerate surfaces for non-liquid solid members of the group to adhere to the hydrated salt agglomerate surfaces and to each other to form agglomerates of larger size but smaller than the sieve openings in a No. 8 U.S. Sieve Series, continuously depositing the resultant agglomerates in a hot air dryer and retaining them therein until their free-moisture content is less than 5 percent by weight.

8. A continuous process according to claim 7 wherein the hydratable salt is a condensed metal phosphate.

9. A continuous process according to claim 8 wherein the condensed metal phosphate is sodium tripolyphosphate.

10. A continuous process according to claim 7 wherein the hydratable detergent salt is sodium carbonate.

11. A continuous process according to claim 7 wherein a mixture of sodium carbonate and sodium tripolyphosphate is agglomerated and substantially hydrated.

12. A continuous process for producing a dry-pourable, non-caking detergent composition which comprises continuously feeding at least one hydratable detergent salt in particulate form and turbulently dispersing said salt for up to 3 seconds in an inert gaseous medium, initiating hydration of the dispersed salt particles by concurrently wetting them with an atomized stream of water or an aqueous solution of an alkali metal silicate metered to provide an amount of water sufficient to substantially hydrate the dispersed salt particles, said metered amount of water being at least a stoichiometric amount but not in excess of about 20% over said stoichiometric amount for hydration, and to cause agglomeration of the particles into agglomerates substantially all of which are small enough to pass through the sieve openings in a No. 8 U.S. Sieve Series, discharging said agglomerates into a closed container, maintaining the agglomerates therein to a temperature above 30° C. and less than 100° C. while continuously gently stirring the agglomerates to minimize formation of oversize lumps, maintaining the agglomerates in said container until their hydratable salt content has been substantially hydrated to a degree of hydration between 70% and 100% of theoretical, removing the hydrated agglomerates from said container and then drying the hydrated agglomerates while being gently stirred until their free moisture content is less than 5% by weight.

13. Process according to claim 12 wherein the hydrating agglomerates are retained in the closed container for up to 30 minutes residence time and the hydrated agglomerates are dried in a fluid bed dryer at temperatures up to 60° C.

14. A continuous process according to claim 13 wherein the particulate detergent salt is a sodium polyphosphate and is hydrated to sodium polyphosphate hexahydrate.

15. A continuous process according to claim 13 wherein the particulate detergent salt is sodium carbonate and is hydrated to sodium carbonate monohydrate.

16. A continuous process for producing a dry-pourable, non-caking detergent composition which comprises turbulently dispersing for up to 3 seconds in an inert gaseous medium a particulate feed of at least one hydratable detergent salt, initiating hydration of the dispersed salt particles by impinging thereon an atomized stream of water metered to provide an amount of water sufficient to substantially hydrate said salt, said metered amount of water being at least a stoichiometric amount but not in excess of about 20% over said stoichiometric amount for hydration, and to cause the salt particles to agglomerate together into agglomerates substantially all of which are small enough to pass through the openings in a No. 8 U.S. Sieve Series, discharging said agglomerates into a closed container, heating the agglomerates therein to a temperature above 30° C. and less than 100° C. while continuously gently stirring the agglomerates to minimize formation of oversize lumps, maintaining the agglomerates in said container until they have been hydrated to at least about 70% of their hydration potential, removing the hydrated agglomerates from said container and turbulently dispersing them for up to 3 seconds in an inert gaseous medium while concurrently mixing therewith one or more members selected from the group consisting of non-ionic surfactants, anionic surfactants, cationic surfactants, neutral alkali metal salts, alkali metal hydroxides, solid chlorine releasing agents, alkali metal silicates and anti-soil redeposition agents, with the proviso that at least one member of the group upon being mixed with the hydrated salt agglomerates is in liquid form to provide sufficient wetting of the hydrated salt agglomerate surfaces for other particulate members of the group to adhere to the hydrated salt agglomerate surfaces and to each other to form new agglomerates containing as one component the hydrated salt agglomerates and as the other component one or more members selected from said group and then drying the new agglomerates under mild agitation conditions at temperatures up to about 60° C. until their free moisture content is reduced to at least 5% by weight.

17. Process according to claim 16 wherein the feed of hydratable salt contains a mixture of a sodium tripolyphosphate and sodium carbonate and the resultant agglomerated hydrated salts after removal from the closed container are turbulently dispersed in an inert gaseous medium for up to 3 seconds while concurrently mixing therewith an aqueous sodium silicate, a surfactant and a solid chlorine releasing agent.

* * * * *

REEXAMINATION CERTIFICATE (341st)

United States Patent [19] [11] B1 4,427,417

Porasik [45] Certificate Issued Apr. 16, 1985

[54] PROCESS FOR PREPARING DETERGENT COMPOSITIONS CONTAINING HYDRATED INORGANIC SALTS

[75] Inventor: Paul A. Porasik, Southfield, Mich.

[73] Assignee: The Korex Company, Wixom, Mich.

Reexamination Request:
No. 90/000,574, Jun. 13, 1984

Reexamination Certificate for:

| | |
|---|---|
| Patent No.: | **4,427,417** |
| Issued: | **Jan. 24, 1984** |
| Appl. No.: | **341,130** |
| Filed: | **Jan. 20, 1982** |

[51] Int. Cl.[3] .......... B01J 2/10; B01J 2/16; C11D 11/00; C11D 17/06

[52] U.S. Cl. .......... 23/313 R; 23/313 AS; 23/313 FB; 252/99; 252/135; 252/174; 252/174.13; 264/117

[58] Field of Search .......... 23/293 A, 313 R, 313 AS, 23/313 FB; 252/99, 135, 174, 174.13, 174.17, 174.21; 264/117

[56] References Cited

U.S. PATENT DOCUMENTS

| | | | |
|---|---|---|---|
| 3,057,683 | 10/1962 | Lecis et al. . | |
| 3,384,452 | 5/1968 | Heymer et al. . | |
| 3,714,051 | 1/1973 | Milesi et al. | 252/135 |
| 3,887,166 | 6/1975 | Van Ginneken . | |

FOREIGN PATENT DOCUMENTS 7502240 8/1976 Netherlands .

OTHER PUBLICATIONS

General Catalogue; Schugi Process Engineers; A10-01-2.039-2000.

*Primary Examiner*—Bradley Garris

[57] ABSTRACT

Non-caking, granular detergent compositions suitable for use in automatic laundry machines or in automatic dishwashing machines are prepared from hydratable particulate detergent salts or such salts in admixture with other detergent ingredients such as non-hydratable detergent salts, surfactants, fillers, corrosion inhibitors, chlorine releasing agents, coloring agents and perfumes under conditions insuring substantially complete hydration of the hydratable detergent salts and agglomeration of the hydrated particulates in the composition into storage stable, dry, pourable agglomerates.

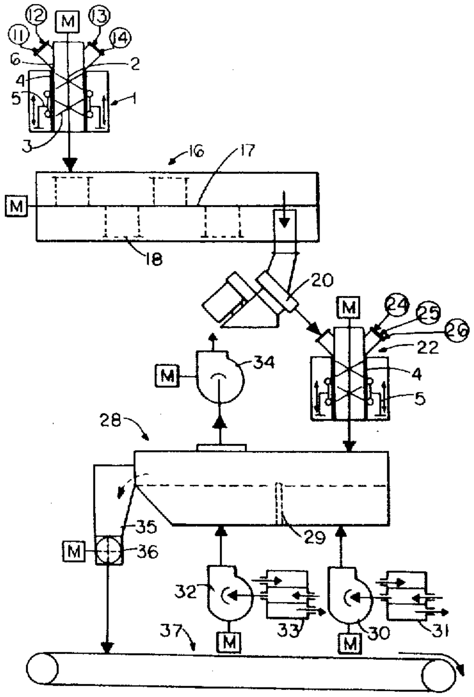

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-17 is confirmed.

* * * * *